US011499681B1

(12) United States Patent
Schramm et al.

(10) Patent No.: US 11,499,681 B1
(45) Date of Patent: Nov. 15, 2022

(54) REPLACEMENT VEHICLE LIGHTING APPARATUS

(71) Applicant: Putco, Inc., Des Moines, IA (US)

(72) Inventors: Conner Schramm, Des Moines, IA (US); Parker Freeman, Des Moines, IA (US); Seth Hoogendoorn, Des Moines, IA (US); Nicholas Niemeyer, Des Moines, IA (US); Paul Thomas Adair, Des Moines, IA (US); James P. Elwell, Grimes, IA (US)

(73) Assignee: Putco, Inc., Des Moines, IA (US)

( * ) Notice: Subject to any disclaimer, the term of this patent is extended or adjusted under 35 U.S.C. 154(b) by 0 days.

(21) Appl. No.: 17/455,740

(22) Filed: Nov. 19, 2021

(51) Int. Cl.
*B60Q 1/00* (2006.01)
*F21K 9/232* (2016.01)
*F21S 45/50* (2018.01)
*F21S 45/47* (2018.01)
*F21S 41/141* (2018.01)

(52) U.S. Cl.
CPC ............ *F21K 9/232* (2016.08); *F21S 41/141* (2018.01); *F21S 45/47* (2018.01); *F21S 45/50* (2018.01)

(58) Field of Classification Search
CPC ..... F21V 9/32; F21V 9/30; F21V 9/00; F21V 9/45; F21V 9/06; F21V 9/38; F21V 29/70; F21V 29/74; F21V 29/76; F21V 29/77; F21V 19/0015; F21V 17/12; F21V 31/00; F21V 31/005; F21V 31/04; F21S 45/47; F21S 45/48; F21S 41/19; F21K 9/235; F21K 9/237; F21K 9/238; B60Q 1/0005; H01L 2924/181
See application file for complete search history.

(56) References Cited

U.S. PATENT DOCUMENTS

| | | | |
|---|---|---|---|
| 8,646,957 B2 | 2/2014 | Johnson et al. |
| 8,746,927 B1 | 6/2014 | Nepple et al. |
| 9,243,796 B1 | 1/2016 | Elwell et al. |
| D808,049 S | 1/2018 | Xie |
| 9,909,752 B2 | 3/2018 | Elwell et al. |

(Continued)

FOREIGN PATENT DOCUMENTS

| | | | |
|---|---|---|---|
| CN | 303209998 S | | 5/2015 |
| CN | 210441135 U | * | 5/2020 |

(Continued)

OTHER PUBLICATIONS

NHTSA, "Driver's Perceptions of Headlight Glare from Oncoming and Following Vehicles", DOT HS 809 669, pp. 1-22, Jan. 2004.

(Continued)

*Primary Examiner* — Omar Rojas Cadima
(74) *Attorney, Agent, or Firm* — McKee, Voorhees & Sease, PLC

(57) ABSTRACT

A replacement lighting apparatus for automobiles is slim and includes an industry-leading footprint to fit into modern headlamps' minimal housing space. The lighting apparatus employs chip scale package light emitting diodes (CSP LEDs), flexible metal heat sinks, an improved collar having a watertight seal formed with an elastomeric gasket and the use of at least one, if not multiple, set screws, a wire harness with a nylon braided sleeve, and a solid-state design for maximum performance, long life, and superior scientifically proven heat mitigation.

16 Claims, 10 Drawing Sheets

(56) References Cited

U.S. PATENT DOCUMENTS

| | | | |
|---|---|---|---|
| 9,995,473 B2 | 6/2018 | Elwell et al. | |
| 10,057,957 B2 | 8/2018 | Julian et al. | |
| 10,801,714 B1 | 10/2020 | Jergensen | |
| 11,054,127 B2 | 7/2021 | Jergensen | |
| 2006/0082987 A1 | 4/2006 | Dorsey et al. | |
| 2012/0201043 A1 | 8/2012 | DiPenti et al. | |
| 2014/0063829 A1 | 3/2014 | Kushalappa et al. | |
| 2017/0241614 A1* | 8/2017 | Vincens | F21S 43/19 |
| 2018/0142879 A1 | 5/2018 | Elwell et al. | |

FOREIGN PATENT DOCUMENTS

| | | | | |
|---|---|---|---|---|
| EP | 2327582 A2 * | 6/2011 | F21S 41/147 |
| JP | 2015085921 A | 5/2015 | |
| JP | 1528469 S | 7/2015 | |
| TW | M501529 U | 5/2015 | |
| WO | WO-2018000694 A1 * | 1/2018 | |

OTHER PUBLICATIONS

NHTSA, "An Investigation of Headlamp Glare: Intensity, Spectrum and Size", DOT 809 672, pp. 1-60, Oct. 2003.

NHTSA, "Assessment of Headlamp Glare and Potential Countermeasures: Survey of Advanced Front Lighting System (AFS) Research and Technology", DOT HS 809 973, pp. 1-108, Dec. 2005.

NHTSA, "Use of Advanced In-Vehicle Technology by Young and Older Early Adopters: Survey Results on Headlamp Systems", DOT HS 810 902, pp. 1-110, Mar. 2008.

NHTSA, "Assessment of Headlamp Glare and Potential Countermeasures: The Effects of Headlamp Mounting Height", DOT HS 810 947, pp. 1-45, Apr. 2008.

NHTSA, "Summary of Headlamp Research at NHTSA", DOT HS 811 006, pp. 1-6, Jul. 2008.

NHTSA, "Summary Report of NHTSA's Forward Lighting Research Program", DOT HS 811 007, pp. 1-10, Jul. 2008.

NHTSA, "Investigation of Safety-Based Advanced Forward-Lighting Concepts to Reduce Glare", DOT HS 811 033, pp. 1-82, Sep. 2007.

NHTSA, "Nighttime Glare and Driving Performance: Research Findings", DOT HS 811 043, pp. 1-118, Sep. 2008.

NHTSA, "Sensitivity Analysis of Headlamp Parameters Affecting Visibility and Glare", DOT HS 811 055, pp. 1-59, Dec. 2008.

NSTSA, "Nighttime Glare and Driving Performance: Executive Summary", pp. 1-56, Feb. 2007.

Code of Federal Regulations, Section 571.108—Federal Motor Vehicle Safety Standard No. 108; Lamps, reflective devices, and associated equipment, vol. 5, Jan. 2004.

* cited by examiner

162

164

REPLACEMENT VEHICLE LIGHTING APPARATUS

FIELD OF THE INVENTION

The present invention relates generally to vehicle lights. More specifically, the invention relates to a replacement vehicle lighting apparatus that uses light emitting diodes (LEDs) as a filament, that when installed within the OEM headlamp housing of an automobile, can maintain pressure within a chamber of said headlamp during operation without causing significant damage or showing other unacceptable signs of wear to the replacement vehicle lighting apparatus and/or other components of the headlamp housing.

BACKGROUND OF THE INVENTION

The background description provided herein gives context for the present disclosure. Work of the presently named inventors, as well as aspects of the description that may not otherwise qualify as prior art at the time of filing, are neither expressly nor impliedly admitted as prior art.

Incandescent light bulbs utilize a small thin wire with two bigger wires holding it up. The electron emitting element in a vacuum tube is what is traditionally thought of as a filament. In incandescent light bulbs, such filaments were historically made of tungsten. To glow bright, an electric current goes through the filament to make the bulb light up. The filament is thus the part of the bulb that produces light.

Halogen headlamps are used in many automobiles. Halogen floodlights for outdoor lighting systems as well as for watercraft are also manufactured for commercial and recreational use. As an example, the H1 is a halogen lamp designed for use in automotive headlamps and fog and driving lamps. The H1, introduced in 1962 by a group of European bulb and headlamp manufacturers, was the first halogen lamp approved for automotive use. The bulb was not approved for use in the US until 1997. Deviations in bulb fittings have led to the introduction of other standardized bulbs, including H1, H3, H7, H11, HB3, and HB4, which are all bulbs having a single filament. H4 bulbs are dual filament, and are used to power both the main and dipped beam of your headlights. One filament is dedicated to each purpose. This can be easier for drivers, as you only have one headlight bulb. Cars that use single filament need one bulb for the main and another for the dipped. H8, H9, H11, and H16 bulbs can, for example, be employed as fog lights.

Halogen bulbs are a mixture of inert gas with a small amount of halogen gas. To improve the light output of halogen bulbs, some bulb manufacturers added Xenon gas into the mix allows the filament to burn brighter. Other bulb manufacturers have added a blue coating to the bulb will turn the color of the light to be more white. The downside to this is a small reduction in light intensity. Thus, it is no surprise these measures have provided inadequate to automobile operators, especially those who drive in heavily wooded areas.

Bulbs with a higher wattage produce more light but have a shorter lifespan. For example, while upgrading to a brighter halogen bulb can produce light that is 20% to 200% brighter than standard halogen bulbs, high power bulbs usually last less than 1 year where as long life halogen bulbs can last up to 4 years.

Thus in recent years it has become popular to use LED lighting to provide illumination for automobiles, including especially headlights, fog lights, taillights, signal lights, and emergency indicators. LED lights can be superior to filament or gas bulbs in terms of efficiency, life span, size, directional control, light intensity and light quality.

High intensity LED lights, especially when used for headlights and fog lights can also generate a significant amount of heat in their semiconductor junctions. This heat can cause problems such as melting or otherwise deteriorating the LED light itself, or its surroundings. In extreme cases the heat can create a fire risk.

To address the excessive heat problem, most others provide fans or to make a large body out of heavy rigid materials to disperse the heat. Fans are not ideal because they consume energy, take up valuable space, make noise, and tend to wear out before the LED lighting element. Using a large rigid body to act as a heat sink is also problematic because of cost and space requirements. To address this, the applicant invented a mechanism for removing heat from semiconductor junctions without using a fan and without using a large rigid body, as shown and discussed in co-owned U.S. Pat. Nos. 9,243,796, 9,909,752 & 9,995,473, which are herein incorporated by reference in their entireties.

However, the trend toward use of LED and HID bulbs is not without fault, and can even make roads less safe, if implemented poorly. Many overseas manufacturers of these products have increased light output without regard to U.S. safety and/or regulations. Other manufacturers implement wild beam patterns, colors, and intensities that together synergize to cause increased risk for distracting other drivers on the road. The beams emitted form these products can reflect off of objects and cause significant glare. A study from the U.S. Department of Transportation found that 88% of drivers noticed headlight glare with one out of every 100 drivers claim glare led to either a crash or a near miss.

Thus, there exists a need in the art for replacement vehicle lighting apparatus which includes a more focused beam pattern, emits light of safe color temperatures, can withstand increases in pressure to a equivalent degree of traditional halogen bulbs, and are otherwise safe to operate on the road.

SUMMARY OF THE INVENTION

The following objects, features, advantages, aspects, and/or embodiments, are not exhaustive and do not limit the overall disclosure. No single embodiment need provide each and every object, feature, or advantage. Any of the objects, features, advantages, aspects, and/or embodiments disclosed herein can be integrated with one another, either in full or in part.

It is a primary object, feature, and/or advantage of the present invention to improve on or overcome the deficiencies in the art.

It is a further object, feature, and/or advantage of the present invention to replace original equipment and replacement standardized sealed beam units used in motor vehicle headlighting systems.

It is still yet a further object, feature, and/or advantage of the present invention to ensure the availability of replacement light sources provide equivalent performance and are thus interchangeable with original equipment light sources.

It is still yet a further object, feature, and/or advantage of the present invention to provide access for convenient replacement of the bulbs without special tools.

The replacement vehicle lighting apparatus disclosed herein can be used in a wide variety of applications. For example, the lighting apparatus can employ a wide variety of filaments, including LEDs that form part of a chip scale package ("CSP"). In some embodiments, the luminous intensity of these CSP LEDs can be limited while still providing the operator with the ability to clearly see objects external to the automobile at night. For example, preferred light outputs can be restricted such that the lighting apparatus emits no more than seventy five-thousand (75,000) candela, more preferably emits no more than fifty thousand (50,000) candela, and most preferably emits no more than (20,000 candela). The measure of the total quantity of visible light emitted by said CSP LEDs per unit of time can, in some embodiments, be characterized by a luminous flux of between one thousand and two thousand lumens (1000-2000 lm). In other embodiments, the total quantity of visible light emitted can reach as high as five thousand lumens (5000 lm).

Filaments can emit lights of colors other than the standard yellow or white color of a headlight/fog light. Filaments can also include sealants which alter the color of light emitted. Additionally, filaments can even be a light emitter of the type that can, in real-time, change the color of light emitted, such as red-green-blue light-emitting diodes ("RGB LEDs").

It is preferred the apparatus be safe, cost effective, and durable. For example, the lighting apparatus should be substantially fireproof, adapted to dissipate static charges, and/or failure (e.g. cracking, crumbling, shearing, creeping) due to excessive pressure and/or prolonged exposure to tensile, compressive, and/or balanced forces acting on the lighting apparatus. The vehicle lighting apparatus can also include watertight seals, such as those that employ elastomeric gaskets, and other chemical sealants applied to various surfaces of the vehicle lighting apparatus to prevent moisture from seeping into the collar and/or components of the integrated circuit.

At least one embodiment disclosed herein comprises a distinct aesthetic appearance. Ornamental aspects included in such an embodiment can help capture a consumer's attention and/or identify a source of origin of a product being sold. Said ornamental aspects will not impede functionality of the present invention. For example, the flexible copper metal heat sinks described herein can be dyed blue.

Methods can be practiced which facilitate use, manufacture, assembly, maintenance, and repair of a replacement vehicle lighting apparatus which accomplish some or all of the previously stated objectives.

The replacement vehicle lighting apparatus can be incorporated into systems which accomplish some or all of the previously stated objectives, and, in some embodiments, could even be adapted to be included in automobiles assembled by an original equipment manufacturer ("OEM").

According to some aspects of the present disclosure, a replacement vehicle lighting apparatus comprises a housing with a mounting structure, a lighting package comprising at least one circuit board, an operative connection that allows for connection to an electrical system of the vehicle, and a filament. The filament comprises at least one light emitting diode (LED) and the LED is soldered onto the at least one circuit board. The replacement vehicle lighting apparatus also comprises a flexible metal heat sink to dissipate heat caused by the at least one light emitting diode, a collar having at least one threaded hole, and a set screw that self-centers when tightened to the least one threaded hole; and a watertight seal that prevents moisture from seeping into the collar.

According to some additional aspects of the present disclosure, the replacement vehicle lighting apparatus can be configured to emit no more than a light output of seventy five-thousand candela and the light output, when tested, can comprise X Y chromaticity coordinates that comply with the Photometry Requirements listed in Table XIX-a or Table XIX-b of the Federal Motor Vehicle Safety Standard 108 ("FMVSS 108") (2004).

According to some additional aspects of the present disclosure, during operation of the lighting apparatus, the replacement vehicle lighting apparatus can withstand increases in pressure of at least 10 pounds per square inch (PSI) within a chamber of a headlamp of the vehicle when the lighting apparatus is installed therewithin, without causing the watertight seal to break or moisture to leak therethrough.

According to some additional aspects of the present disclosure, the replacement vehicle lighting apparatus can further comprise at least one other set screw, wherein: the at least one other set screw opposes the set screw; or the set screw and at least one other set screw are symmetrically arrayed about a circumferential surface of the collar.

According to some additional aspects of the present disclosure, the replacement vehicle lighting apparatus further comprises a tolerance between the collar and other components of the lighting apparatus can be minimized by tightening the set screw to a point where the watertight seal becomes a hermetic seal.

According to some additional aspects of the present disclosure, the replacement vehicle lighting apparatus further comprises a sealant inserted between the collar and the housing. The sealant comprises silicon and is positioned on an under side of the lighting apparatus near the flexible metal heat sink.

According to some additional aspects of the present disclosure, the replacement vehicle lighting apparatus further comprises an elastomeric gasket inserted between the collar and the housing.

According to some additional aspects of the present disclosure, the replacement vehicle lighting apparatus further comprises a tough seal applied to an interior of the lighting apparatus to allow the lighting apparatus to facilitate maintaining the pressure within the housing.

According to some additional aspects of the present disclosure, the lighting apparatus is configured to lock the collar in an orientation clocked to 90° normal to the ground, causing a surface of a light emitting source in the lighting apparatus is oriented perpendicular to the ground.

According to some additional aspects of the present disclosure, the flexible metal heat sink comprises a flexible metal fabric.

According to some additional aspects of the present disclosure, the flexible metal heat sink conducts heat within a loop.

According to some additional aspects of the present disclosure, the flexible metal heat sink comprises tinned copper strands.

According to some additional aspects of the present disclosure, the flexible metal heat sink comprises aluminum fins.

According to some additional aspects of the present disclosure, the replacement vehicle lighting apparatus further comprises a laser etched marking on the lighting apparatus that identifies a source of origin or compliance with a government mandated regulatory standard.

According to some additional aspects of the present disclosure, the housing comprises a tower portion; the at least one circuit board comprises two circuit boards; and said two circuit boards being mounted on opposite sides of the tower member.

According to some additional aspects of the present disclosure, the operative connection is established with a wire harness comprising one or more wires protected by a nylon sleeve.

According to some additional aspects of the present disclosure, the filament creates the appearance of an Edison style light bulb.

According to some additional aspects of the present disclosure, the lighting package is a chip scale package ("CSP") comprising an integrated circuit including the at least one circuit board; a silicon die of the at least one LED: is mounted on an interposer upon which pads or balls are formed; or is formed on pads that are etched or printed directly onto a silicon wafer, thereby resulting in a size of the chip scale package very close to the size of the silicon die.

These and/or other objects, features, advantages, aspects, and/or embodiments will become apparent to those skilled in the art after reviewing the following brief and detailed descriptions of the drawings. Furthermore, the present disclosure encompasses aspects and/or embodiments not expressly disclosed but which can be understood from a reading of the present disclosure, including at least: (a) combinations of disclosed aspects and/or embodiments and/or (b) reasonable modifications not shown or described.

BRIEF DESCRIPTION OF THE DRAWINGS

Several embodiments in which the present invention can be practiced are illustrated and described in detail, wherein like reference characters represent like components throughout the several views. The drawings are presented for exemplary purposes and may not be to scale unless otherwise indicated.

FIG. 8A shows a partially assembled view of the wire harness. FIG. 8B shows a detailed view of the connectors of the wire harness. FIG. 8C shows a detailed view of the nylon sleeve. FIG. 8D shows a detailed view of the anti-flicker drive box.

FIG. 10A captures results that stem from use of traditional LEDs. FIG. 10B captures results from use of the improved replacement vehicle lighting apparatus of FIG. 1 employing CSP LEDs.

An artisan of ordinary skill in the art need not view, within isolated figure(s), the near infinite number of distinct permutations of features described in the following detailed description to facilitate an understanding of the present invention.

DETAILED DESCRIPTION OF THE INVENTION

The present disclosure is not to be limited to that described herein. Mechanical, electrical, chemical, procedural, and/or other changes can be made without departing from the spirit and scope of the present invention. No features shown or described are essential to permit basic operation of the present invention unless otherwise indicated.

Figure 1:
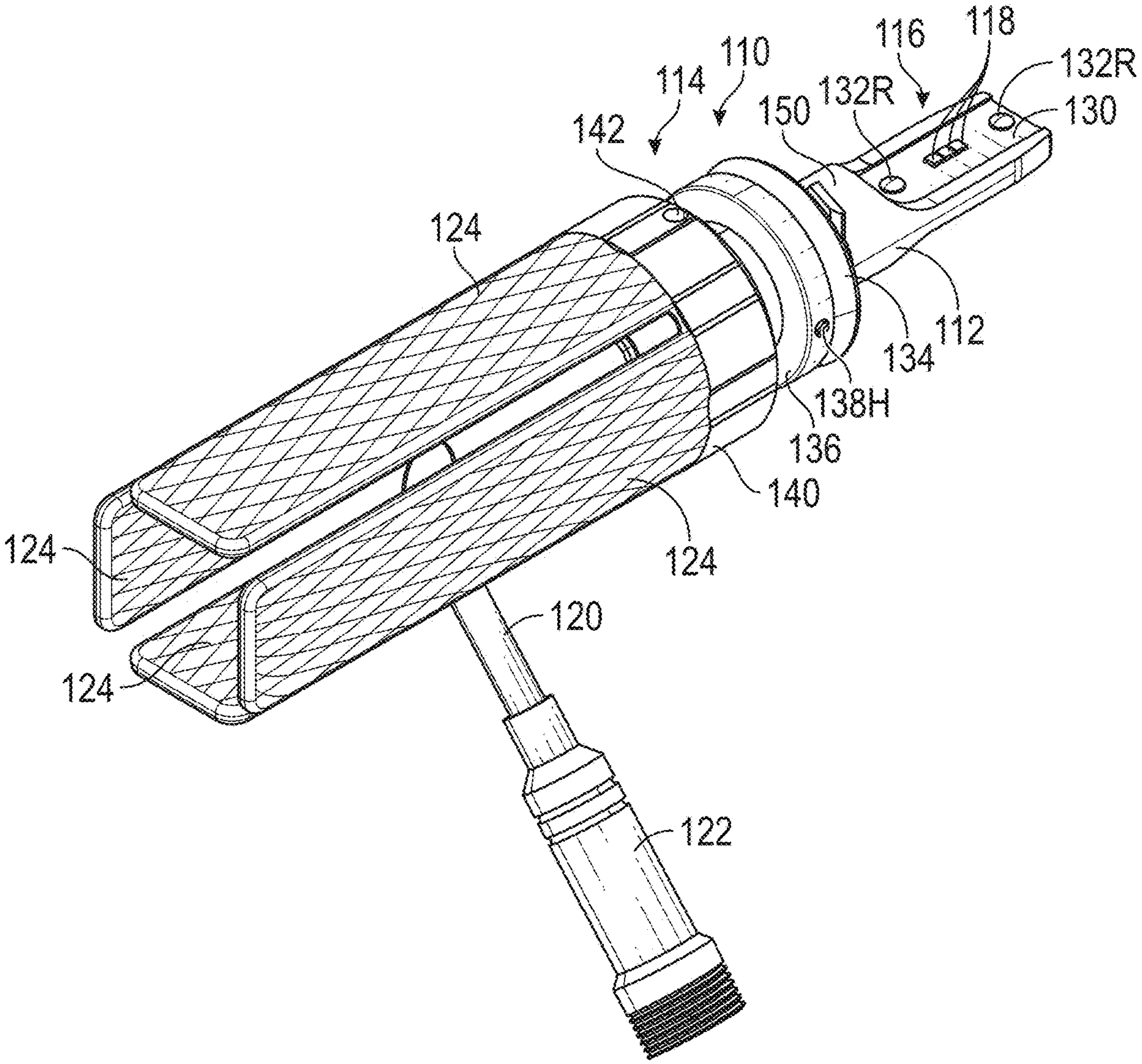
FIG. 1 shows a perspective view of a replacement vehicle lighting apparatus with a heat sink and an improved collar, according at least some aspects of the present disclosure.
Figure 2:
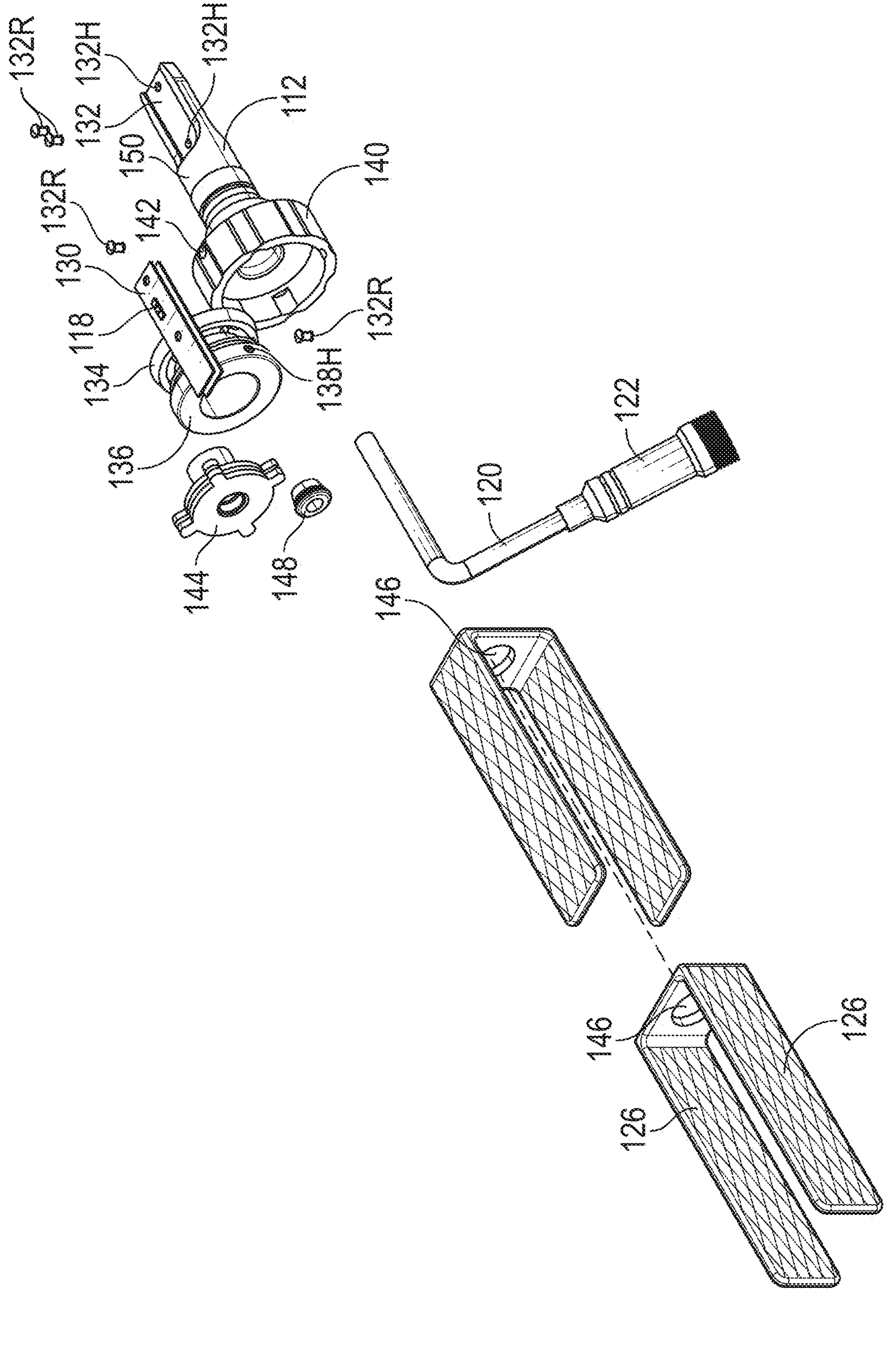
FIG. 2 shows an exploded view of the replacement vehicle lighting apparatus of FIG. 1.

FIG. 1 and FIG. 2 show an LED lamp 110 according to one embodiment of the present invention. The LED lamp 110 is adapted for use as a headlight in an automobile. The LED lamp 110 includes a tower body 112 and mounting structure 114 that permit the lamp 110 to be mounted on an automobile. Together the tower body 112 and mounting structure 114 provide a mounting base that is adapted for mounting to a light fixture, such as an automobile headlight. The tower body 112 includes an opening and/or exposed portion 116 through which light emitting diodes 118 are provided. The tower body 112 may include features near the light emitting diode openings 116 that shape the light emitted by the lamp 110. For example, projection(s) may be provided near the opening that partially blocks a portion of the light emitted by the LEDs 118, and especially blocks the light from the end-most light emitting diode 118 in one direction to shape the light beam emitted by the lamp 110.

The LEDs 118 provided can be suitable for use as a headlight lamp that provides a low beam and a high beam. The low beam LEDs 118 turn off and the upper light emitting diodes are illuminated on each side. In alternative versions the lower light emitting diodes will dim about 50% and the upper light emitting diodes will turn on 100% in high beam mode. In low beam mode the lower light emitting diodes would still be 100% and the upper light emitting diodes will be off.

The LEDs 118 used can be surface-mount device ("SMD") LEDs. The SMD LED chips are mounted on a heat conducting member 132 as a holder with rivets 132R that fit into holes 132H of the heat conducting member 132. The SMD LED chips connected to the PCB by alloy wire(s) 128. The electrical current flows from the PCBs 130 and through the alloy wire(s) 128 to power the LEDs 118. During use, too much heat or a surge in current can damage the wires 128 resulting in LED failure.

Figure 3:
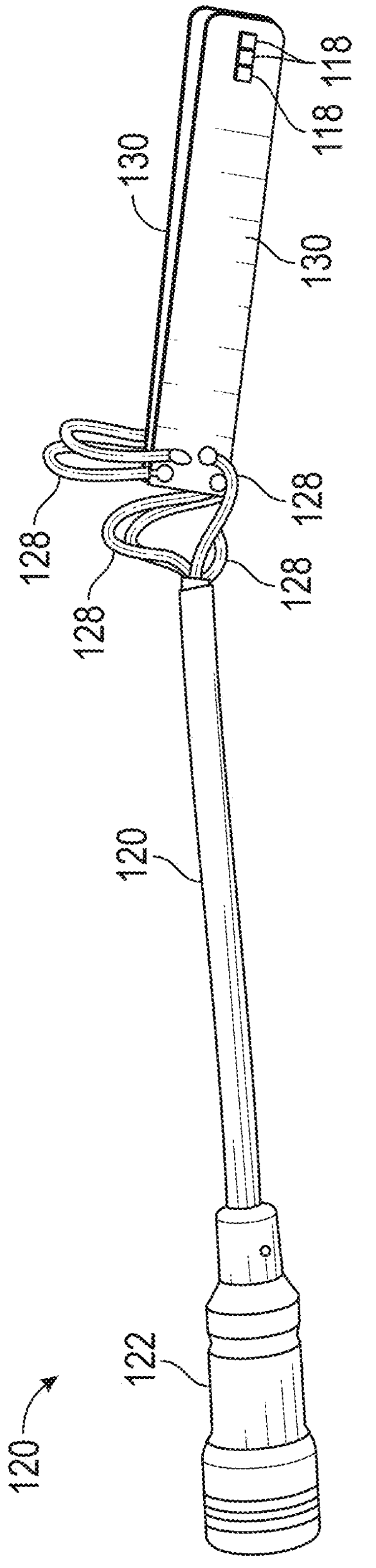
FIG. 3 is a perspective view of a wire harness, circuit boards, and light emitting diodes used in making the LED lamp of FIG. 1.
Figure 4:
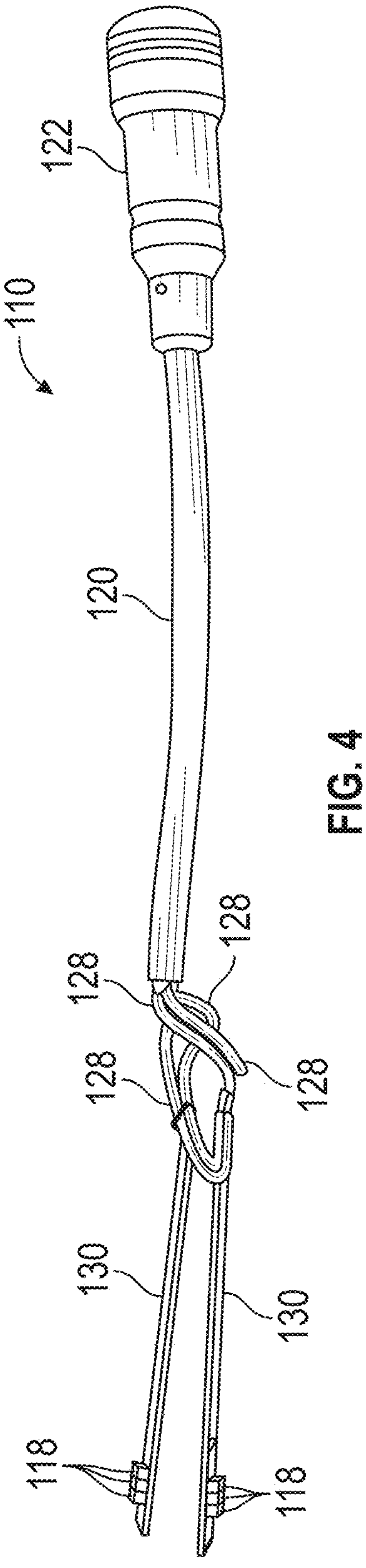
FIG. 4 is a perspective view of the wire harness, circuit boards, and light emitting diodes of FIG. 3.

FIGS. 3-4 shows internal components of the LED lamp 110 with the tower body 112 and mounting structure 114 removed. The circuit boards 130 are mounted on opposite sides of a heat conducting member 132. This circuit boards 130 may be fixed to the heat conducting member 132 by the use of a heat conducting electrically insulating adhesive, such as a two-part epoxy with ultra-high thermal conductivity and adhesive strength. In one embodiment, an epoxy under the brand name Silanex Model #ST0903 has been found to be effective. The circuit boards 130, if in good thermal connection with the heat conducting member 132, can readily transfer heat energy from the circuit boards 130 to the heat conducting member 132. The heat conducting member 132 should be made of a material that is a good conductor of heat, and that is durable enough to serve as a substrate for the circuit boards 130. According to one embodiment, the heat conducting member 132 is made from a flattened copper tube. Alternatively, the heat conducting member 132 could be formed from a solid copper bar to approximately the same dimensions. Other materials, including especially other metals that are good heat conductors, may be used to form the heat conducting member.

FIGS. 3-4 also shows in particular some of the internal components of the LED lamp 110 of FIGS. 1 and 2 with SMD LEDs employed. The wire harness 120 can include a plurality of electrically conductive wires 128 that are electrically connected, for example by soldering, to two circuit boards 130. Each of the circuit boards 130 is shown having three light emitting diodes 118 attached at an opposite ends of the circuit board 130 from the attachment point of the wires 128. In some embodiments, LEDs 118 and a circuit board 130 are only warranted on one side of the heat conducting member 132. The LEDs 118 on each circuit board 130 may correspond, for example, with a low beam setting and a high beam setting when used in an automobile. Those of skill in the art will appreciate that any number of light emitting diodes 118 might be used beneficially in the present invention. The circuit boards 130 are adapted to control the light emitting diodes according to the input voltage provided through the wire harness 128.

In manufacturing the LED lamp 110 of FIGS. 1-2, the assembly FIGS. 3-4 could be accomplished by soldering wire(s) 128 and/or a wire harness 120 to the circuit boards 130. The circuit boards 130 are available as component parts that include the light emitting diodes 118. Various circuit boards 130 and LED 118 combinations may be used depending upon the lighting requirements. In the preferred embodiment the light emitting diodes 118 are rated to produce at least 1100 lumens, and in some embodiments, are limited to producing no more than 2500 lumens. In others, the LEDs 118 are rated to produce up to 6000 lumens.

The wire harness 120 shown extends away from one end of the tower body 112 (i.e., in a direction not directly across the tower body 112, toward a second end of the tower body 112). The wire harness 120 includes a plug 22 that is adapted to interface with an LED ballast (not shown) that will connect to the automobiles electrical system. Further aspects of the wire harness 120 are described in more detail with reference to FIGS. 8A-8D, infra.

In a preferred embodiment, the LEDs 118 form part of a chip scale package. A CSP is an LED package, a type of integrated circuit package with a size equivalent to a LED chip. In some embodiments, the CSP LED package is at most no larger than 20% than that of a standard LED chip. The CSP features integrated component features that do not need soldered wire connections which reduce thermal resistance, reduce heat transfer path, and reduce possible failure points. Unlike SMD LEDs, CSP chips can be directly applied to the printed circuit boards 130 (shown FIGS. 3-4). This effectively shortens the heat flow path to the substrate and reducing the thermal resistance of the light source. Under the same current, CSP chips have higher intensity and lower current consumed compared to SMD chips. Two possible LED failure points are removed as a result of the CSP LED chip not needing a chip holder or connected wires.

To fabricate the integrated circuit of a CSP LED package, semiconductors, such as those that monocrystalline silicon, can be used as the main substrate used for the integrated circuit. However, some III-V compounds of the periodic table such as gallium arsenide are used for specialized applications like said LEDs 118. Semiconductor integrated circuits can, for example, be fabricated in a planar process which includes three key process steps—photolithography, deposition (such as chemical vapor deposition), and etching. Mono-crystal silicon wafers can be used in some applications, such as where gallium arsenide is used. The wafer does not need to comprise entirely silicon. Photolithography can be used to mark different areas of the substrate to be doped or to have polysilicon, insulators or metal (typically aluminium or copper) tracks deposited on them. Manufacturers of these integrated circuits can employ doping to add dopants to semiconductor material(s). The integrated circuits described herein can be composed of many overlapping layers, each defined by photolithography, which can be indicated to persons by way of different colors. Some layers could, e.g., mark where various dopants are diffused into the substrate (called diffusion layers), some layers could, e.g., define where additional ions are implanted (implant layers), some layers could, e.g., define the conductors (doped polysilicon or metal layers), and some layers could, e.g., define the connections between the conducting layers (via or contact layers). All components could then be constructed from a specific combination of these layers. Each device can be tested before packaging using automated test equipment ("ATE"), in a process known as wafer testing, or wafer probing. The wafer can then cut into rectangular blocks, each of which is called a die.

CSP chips are small in size but feature high intensity per unit with less heat. CSP is ideal for applications like LED headlights. Automotive LED light manufacturers use CSP chips to replicate the size and location of the tungsten filament in halogen bulbs to create beam patterns much like halogen bulbs. Some additional benefits of the use of CSP LEDs are discussed with reference to FIGS. 9-12, infra.

Referring back to FIGS. 1-2, also extending from the one of the tower body 112 is a flexible heat sink 124.

Figure 7:
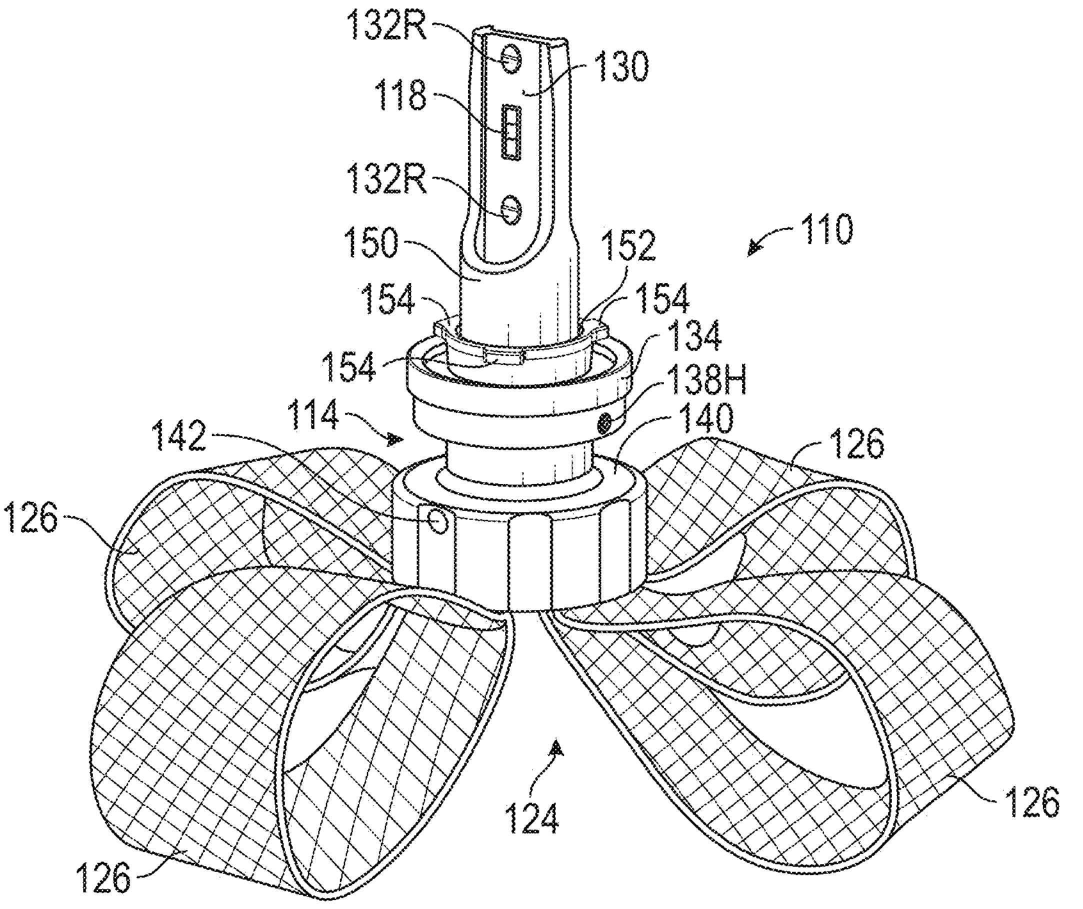
FIG. 7 is another perspective view of an LED lamp with a heat sink and an improved collar with the flexible metal heat sinks positioned and stretched to prevent substantial contact with one another to maximize surface area available to dissipate heat.

The flexible heat sink 124 can have loops 126 of a metal fabric that can be easily deformed to fit in a variety of spaces depending upon where the lamp 110 is installed, as shown in FIG. 7. The loops 126 need not be mechanical in nature, but can comprise any mechanical shape which facilitates looping thermal energy. For example, each heat sink 124 could include tinned stranded copper ropes that, in implementation, include wire(s) with a single core wire surrounded by additional wires twisted in spiral. As one of ordinary skill in the art would appreciate, thermal loops will be in such an embodiment formed regardless of whether the flexible heat sinks 124 have a free end.

As best seen in FIGS. 1-2, the flexible heat sink(s) 124 can be held in place by a can elastomeric gasket 134, a collar 136, set screws 138SS that fit into holes 138H of the collar 136, base 140, a pegged holder 144, a mounting aperture 146 for a peg of the pegged holder 144, a receiver 148 for plugs 122, and/or a combination thereof. The receiver 148 can be shaped and/or employ an elastomeric gasket so as to allow as little moisture into the collar 136 from an underside of said collar 134. Other fastening mechanisms and/or configurations may be used as long as they allow for good thermal contact between the heat sink(s) 124 and the heat conducting member 132.

The base 140, or cap, is the bottom part of the bulb that connects to the socket. Different bases can make it impossible to simply switch between fittings for distinct application. The base 140 may have to be shaped and/or otherwise configured to the bulb for which the vehicle is designed.

Figure 5:
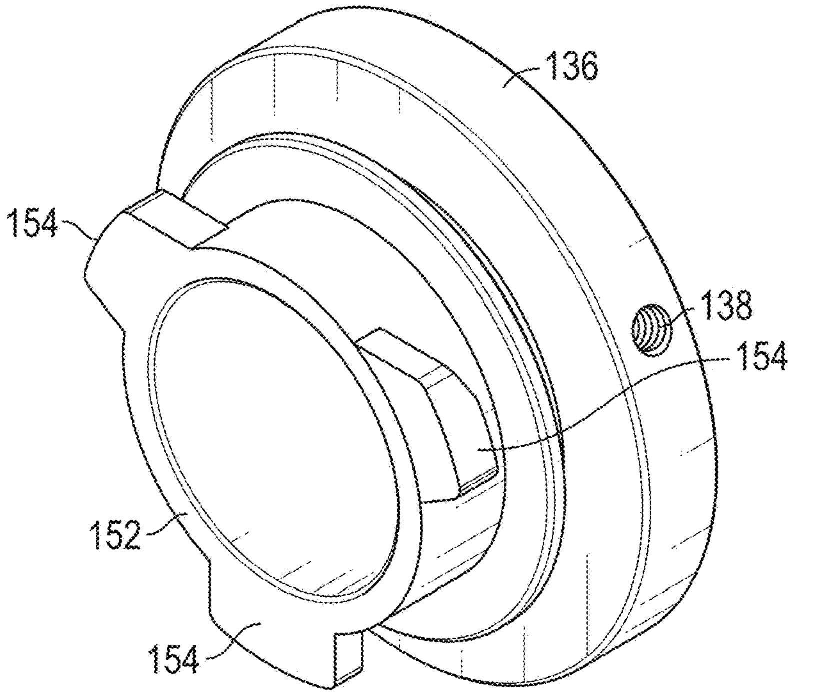
FIG. 5 shows a detailed view of an improved collar according to one embodiment of the present invention.
Figure 6:
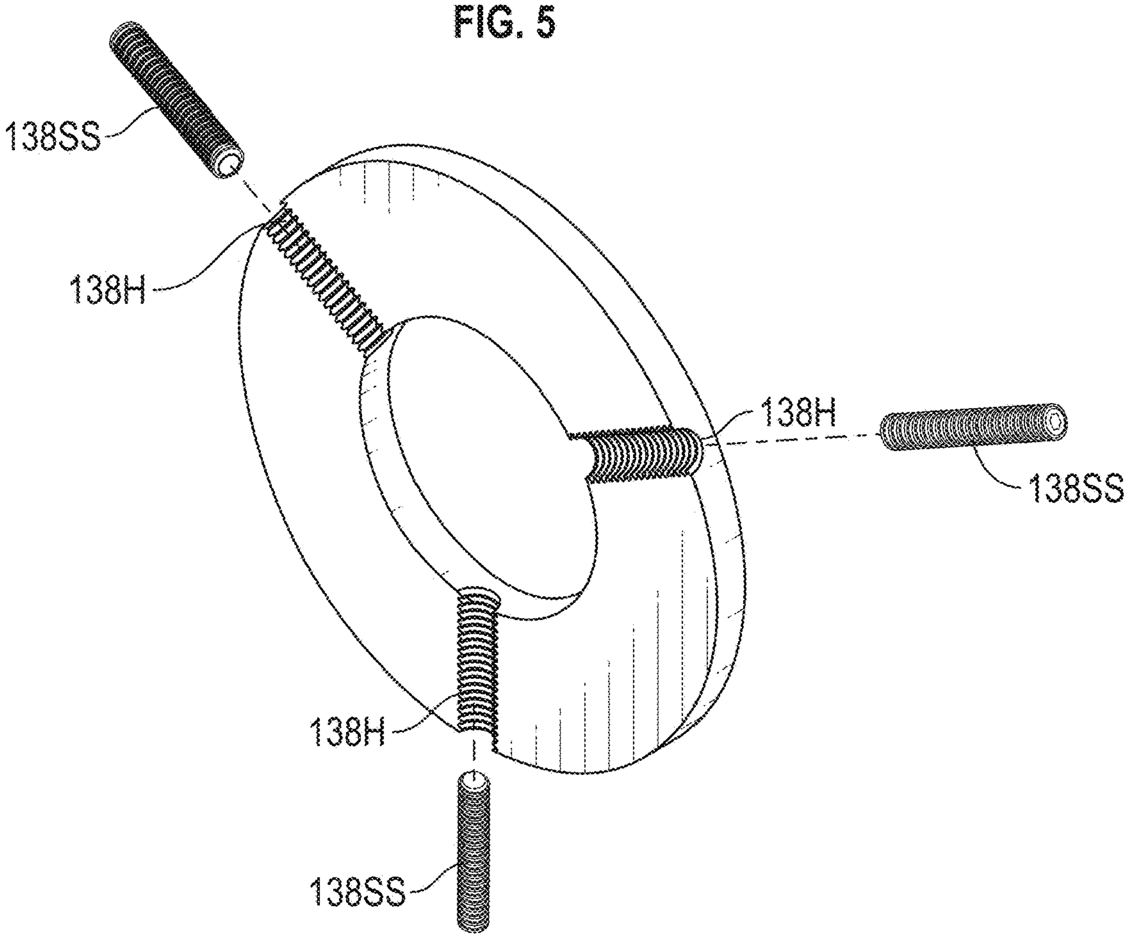
FIG. 6 shows a cross-sectional, planar view of an improved collar according to one embodiment of the present invention.

In a preferred embodiment, at least two set screws 138SS at least two set screws that self-center when tightened to the at least two threaded holes 138H, as shown in FIGS. 5-6. The threaded holes 138H can be radially arrayed (even symmetrically radially arrayed) around a circumferential surface of the collar 136. Three set screws 138SS are included in a preferred embodiment and placed one hundred twenty degrees (120°) from each other.

In yet another embodiment, there could be only one set screw employed. For example, the collar 136 can comprise a C-ring with two apertures that align near the free ends of the C-ring. As the set screw 138SS is threaded through the aperture(s), the shape of the C tightens until it forms an O and is becomes watertight, if not airtight.

In yet another embodiment, the idea of the C-ring can be employed on an outer surface of the collar while the inner surface employs an O-ring. The gap of the C-ring would be greatest at the outer surface and would taper toward the inner surface, at which point it becomes solid, ensuring the internal portion of the collar remains sealed. The internal surface will function much like a living hinge.

In yet other embodiments, each set screw 138SS can be opposed (located approximately 180° from) another set screw 138SS from the at least two screws 138SS.

The collar 134 can also include a clocking and locking portion 152 with angled protrusions 154. The angled protrusions are asymmetrically arrayed about a circumferential surface of the clocking and locking portion 152. In a preferred embodiment, the collar 134 can be locked in an orientation clocked ninety degrees (90°) normal to the ground. This can cause a surface of a light emitting source in the bulb to be oriented perpendicular to the ground.

In some embodiments, the flexible heat sink 124 can be formed from a braided flat copper cable, from braided or woven tinned copper, or from other flexible metal fabrics. In other embodiments, the flexible heat sinks 124 can be formed from thinner copper strands wound into ropes. In yet even other embodiments, the flexible heat sinks 124 can be formed from deformable aluminum fins. In the embodiment of FIG. 7, two "infinity style" loops 126, each about eight inches long, share a mounting aperture 146 (seen in FIG. 2) at the middle and are employed.

When the elastomeric gasket 134 is inserted into the collar 136, a watertight seal can therefore be formed. In some embodiments, the elastomeric gasket 134 can be placed between the collar 136 and other portions of the housing of the replacement vehicle lighting apparatus 110, such as the tower portion 112, mounting structure 114, and/or base 140, The replacement vehicle lighting apparatus 110 can also include a tough seal advanced polymer, making the replacement vehicle lighting apparatus 110 100% waterproof.

In some embodiments, the tower body 112 may also include molded-in features that aid in mounting the lamp 110 further in place. For example, the tower body 112 may include mounting projection(s) that include a wedge surface (not shown) that is used to draw the lamp into tight engagement with a socket in a headlight or other light fixture.

Figure 8A:
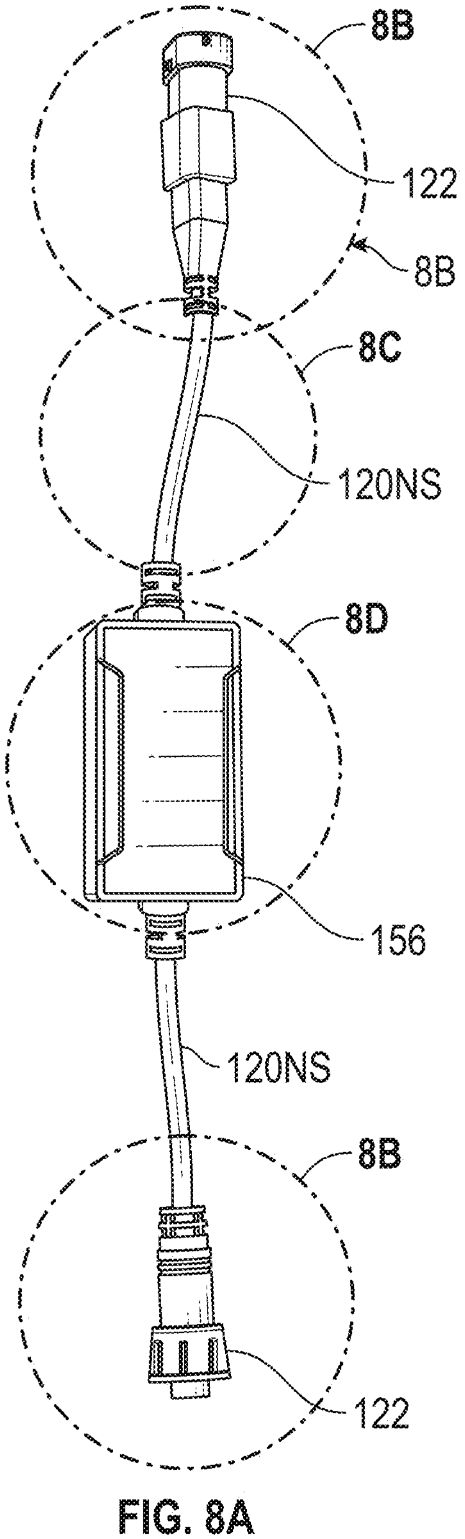
FIGS. 8A-8D show aspects of the wire harness.

FIG. 8A shows an assembled view o the wire harness 120. The wire harness 120 includes a precision terminal system that allows for with near perfect fitment with existing OEM harnesses.

Figure 8B:
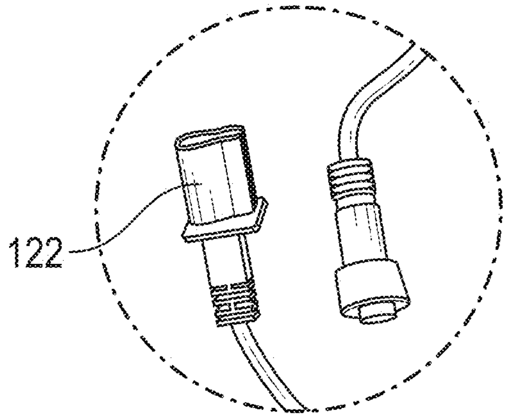

FIG. 8B is a detailed view of exemplary plugs 122 that allow for connection to an electrical system of an automobile.

Figure 8C:
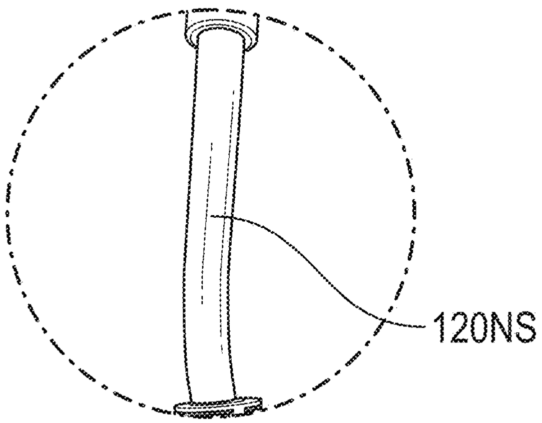

FIG. 8C shows the nylon braided sleeve 120NS, which is braided from polyethylene terephtalate mono filament fibers. The nylon sleeve 120NS resists abrasion, has a wide operating temperature range, and is resistant to UV radiation.

Figure 8D:
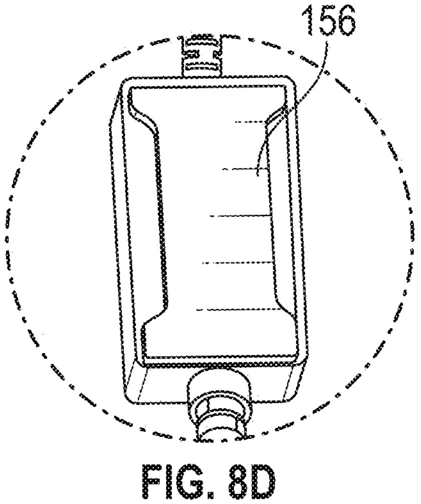

FIG. 8D shows the anti-flicker drive box 156. The anti-flicker drive box 156 is an all in one box that can operate at a high refresh rate to reduce or eliminate the perception of the LEDs 118 flickering.

As shown in FIGS. 9-13, the lighting apparatus (e.g., lamp 110) can be configured as a headlamp and can operate with the characteristics described therein, and/or withstand operation according to the procedures described therein.

For example, the lighting apparatus 110 can be configured such that a new, unused abrading pad constructed of 0000 steel wool not less than 2.5±0.1 cm wide, rubber cemented to a rigid base shaped to the same vertical contour of the lens, causes abrasion to the lighting apparatus 110 when the lighting apparatus 110 is in a mounted position (with the lens facing upward). When mounted and resting on the lens of the test headlamp, the abrading pad can (i) have a pad pressure of 14±1 KPa at the center and perpendicular to the face of the lens, (ii) be cycled back and forth (1 cycle) for 11 cycles at 4±0.8 in (10±2 cm) per second over at least 80% of the lens surface, including all the area between the upper and lower aiming pads, but not including lens trim rings and edges, and (iii) still meet desired photometry requirements, such as those of listed in Table XIX-a or Table XIX-b of the Federal Motor Vehicle Safety Standard 108 ("FMVSS 108") (2004).

Figure 9:
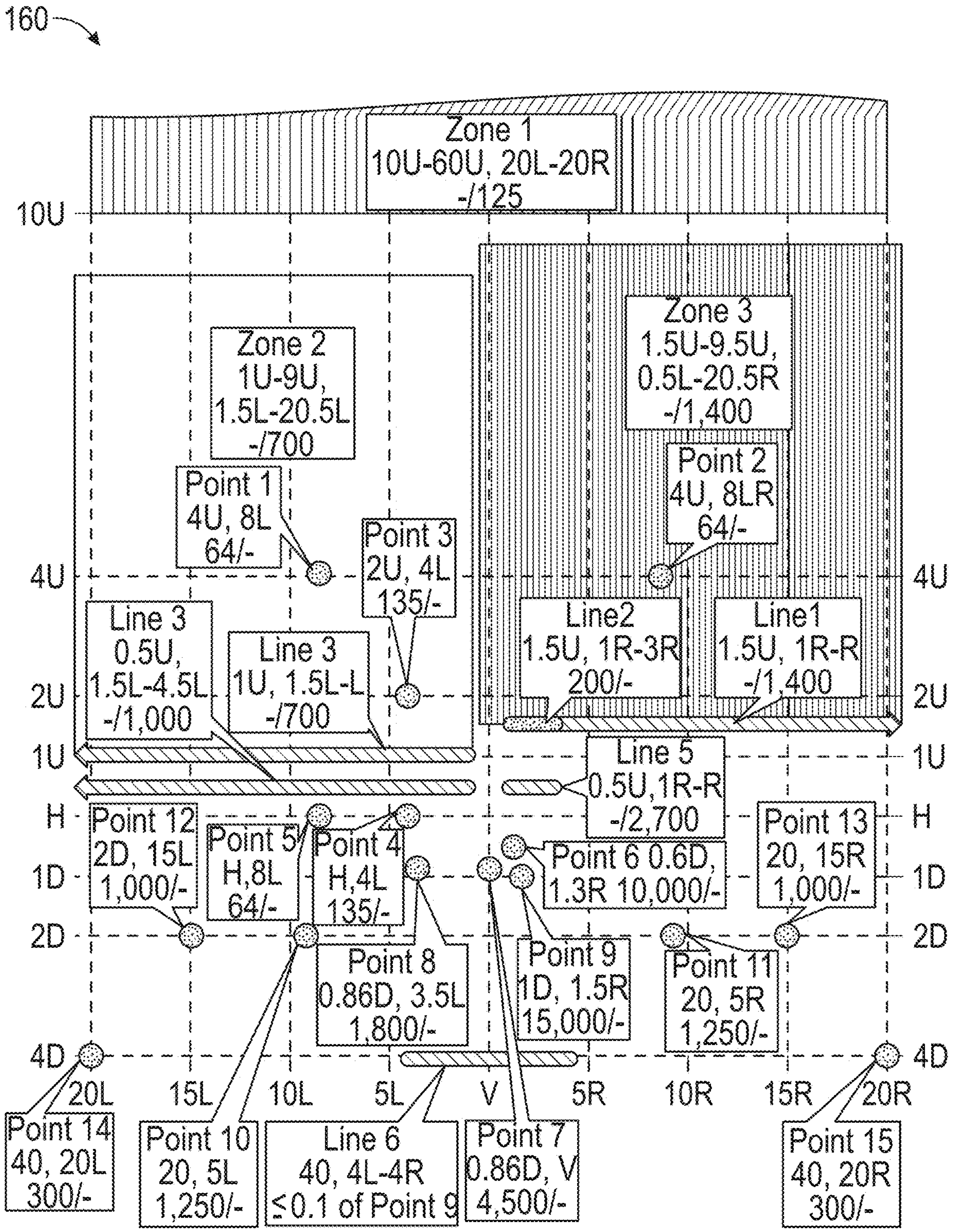
FIG. 9 shows exemplary test criteria related to the measurement of beam patterns.
Figure 10A:
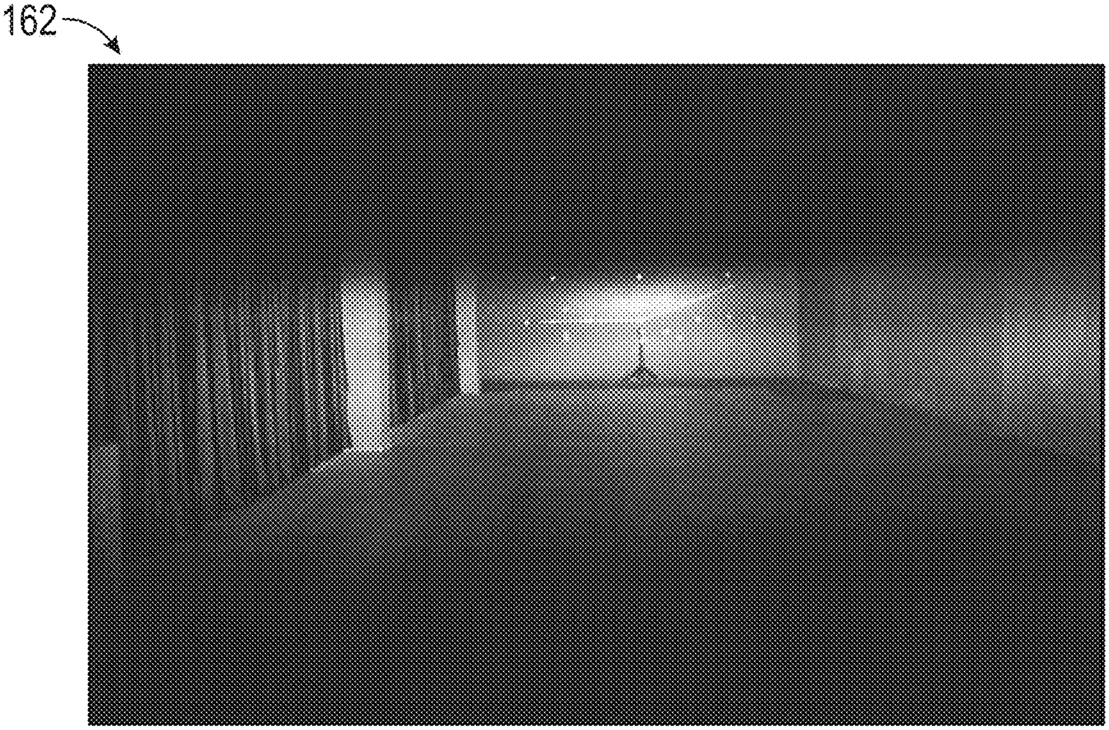
FIG. 10A (Prior Art)
FIGS. 10A-B capture results of tests using the test criteria of FIG. 9.
Figure 10B:
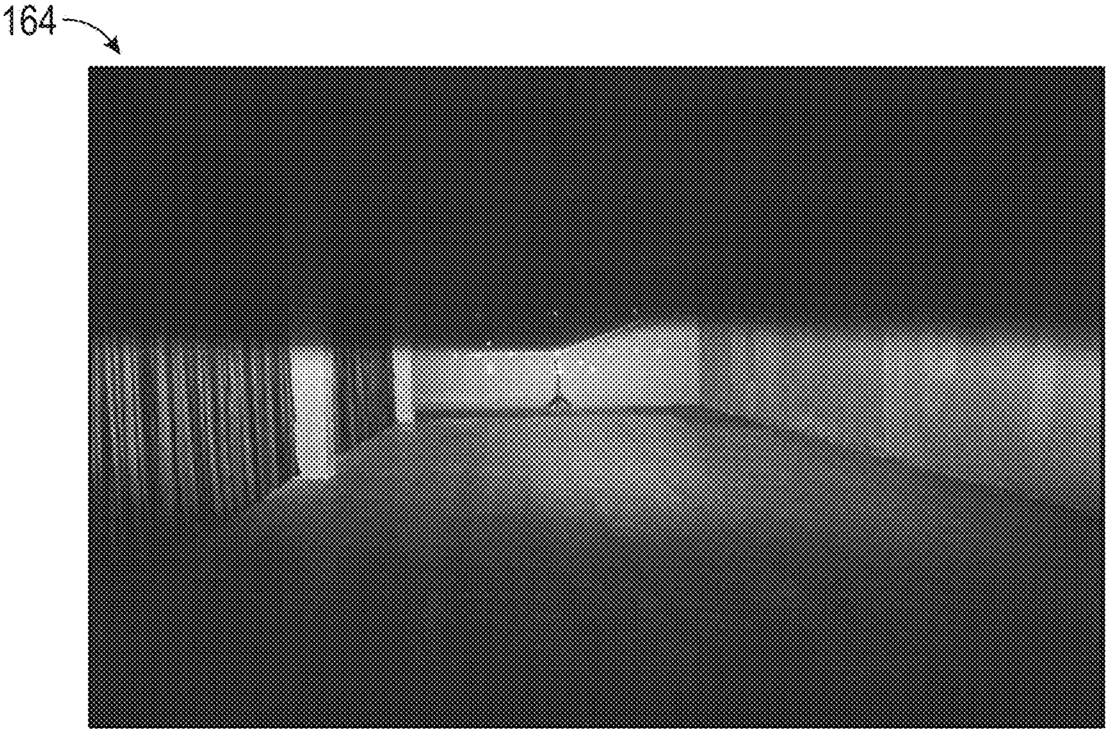
Figure 11:
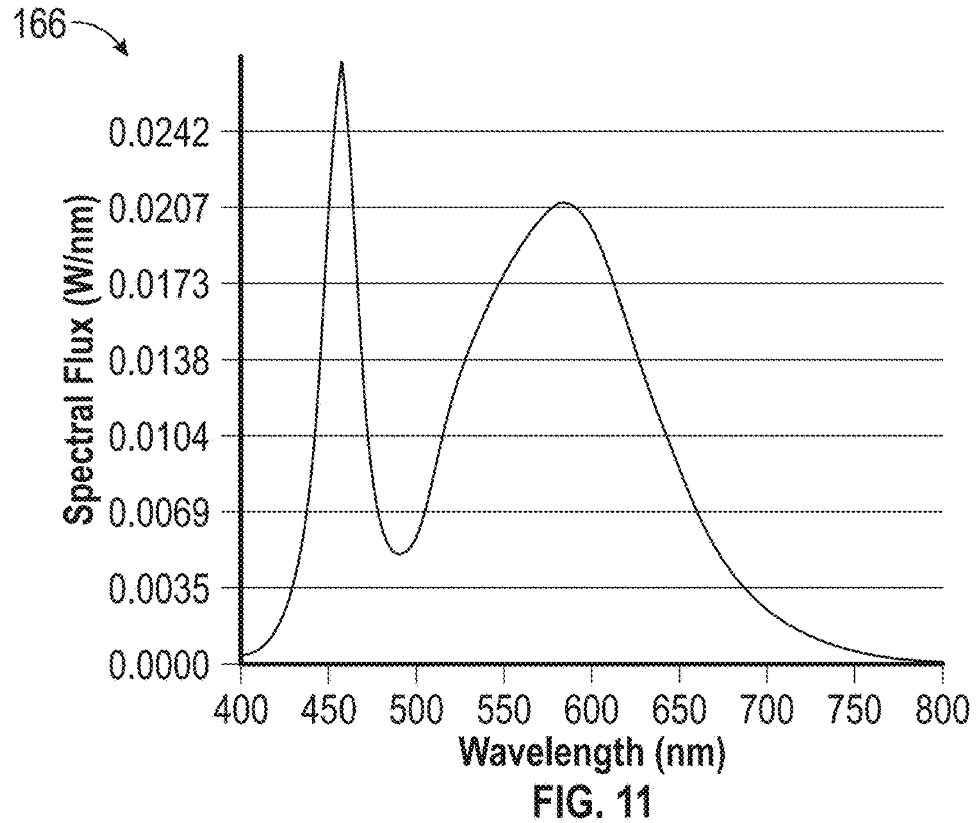
FIG. 11 graphs the relative spectral power distribution measured as a result of testing the improved replacement vehicle lighting apparatus of FIG. 1.
Figure 12:
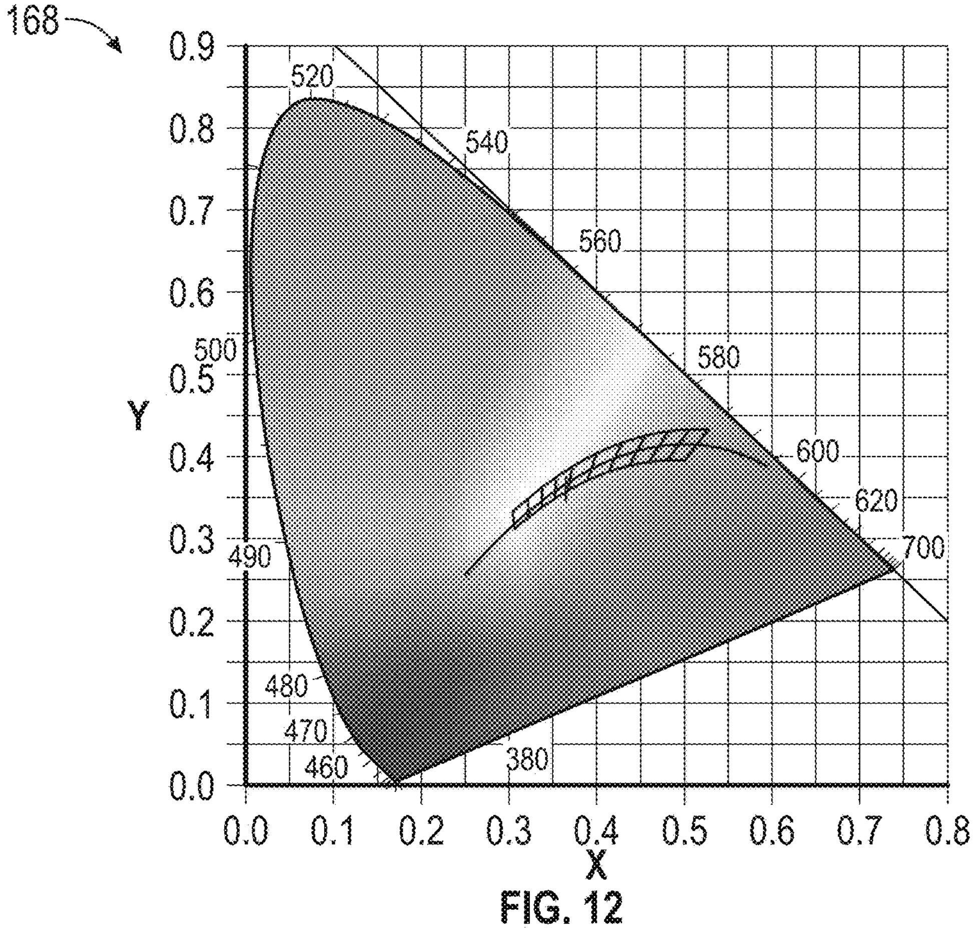
FIG. 12 plots results related to testing the color temperature of light emitted from the improved replacement vehicle lighting apparatus of FIG. 1 on a CIE xy chromaticity diagram (which uses the CIE xyY color space).
Figure 13:
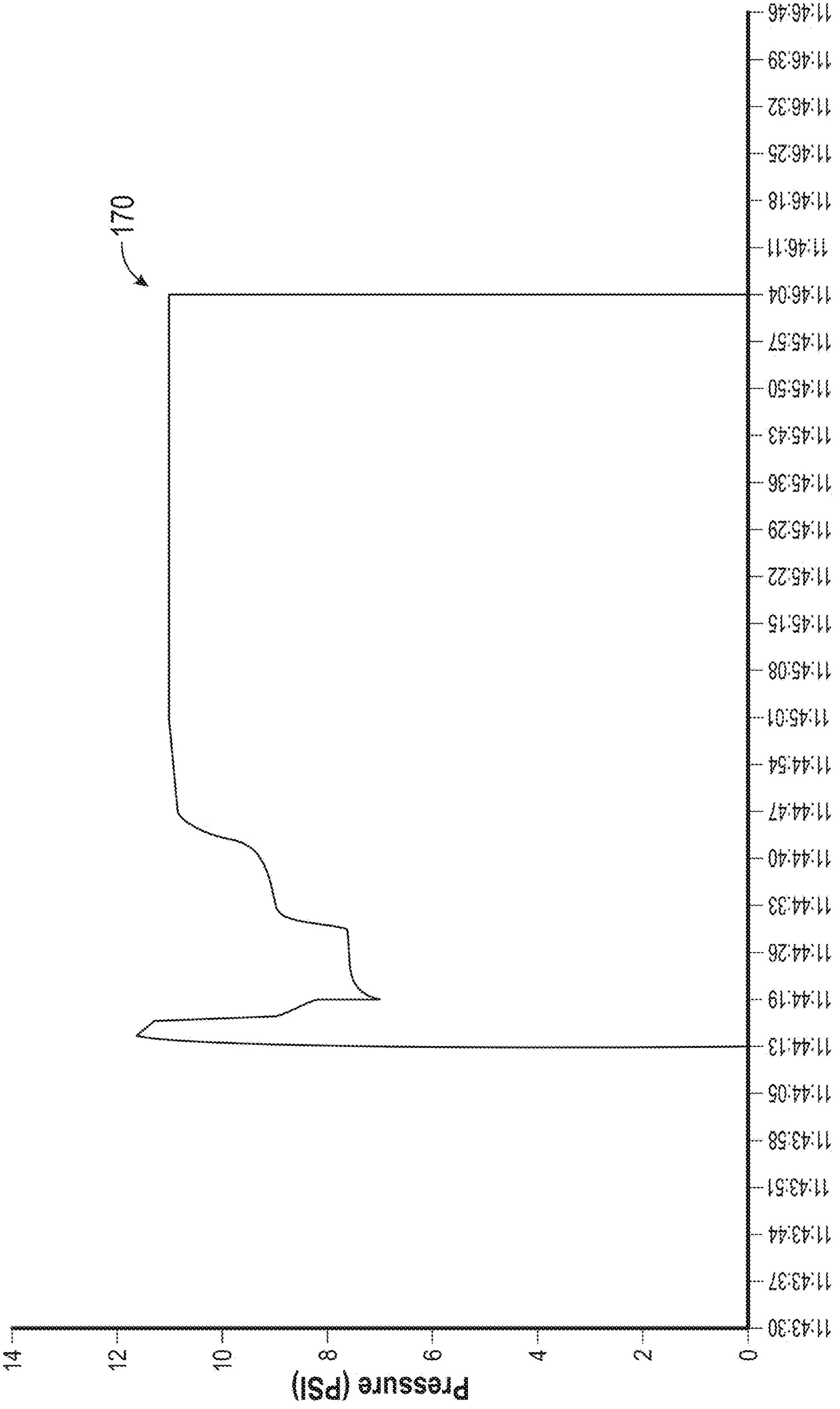
FIG. 13 graphs pressure exerted on the replacement vehicle lighting apparatus of FIG. 1, which proved the replacement vehicle lighting apparatus is able to withstand exposure to the pressure test without physical damage, e.g., did not cause any leaks.

It is also worth noting that if the testing procedure outlined in FIG. 9 is used with traditional LEDs as opposed to the CSP LEDs contemplated herein, photometric requirements will not be met and a blurring of light similar to that shown in FIG. 10A can be observed. It is envisioned that SMD LEDs can pass the testing procedures outlined in FIG. 9 if configured correctly. If however the CSP LEDs are employed, the chances significantly increase and the beam pattern in the resulting emitted light will be beneficially focused, as is shown in FIG. 10B, with the characteristics (e.g., spectral flux as a function of wavelength, as plotted on FIG. 11, and a color temperature as represented by the curved line located on the CIE xy chromaticity diagram of FIG. 12.

In yet another embodiment, the lighting apparatus 110, can be adapted to chemically resist (a) ASTM Reference Fuel C, which is composed of Isooctane 50% volume and Toluene 50% volume; (b) a tar remover consisting by volume of 45% xylene and 55% petroleum base mineral spirits; (c) power steering fluid; (d) a windshield washer fluid consisting of 0.5% monoethanolamine with the remainder 50% concentration of methanol/distilled water by volume; and (e) antifreeze (50% concentration of ethylene glycol/distilled water by volume). Thus, the lighting apparatus 110, even if it were to come into direct contact with said chemical substances, will have no surface deterioration, coating delamination, fractures, deterioration of bonding or sealing materials, color bleeding, or color pickup visible.

Moreover, the lighting apparatus 110 can also be configured such that when a power source is hooked thereto and set to provide 12.8 volts, a resistance set to produce 10 amperes, connectors attached to their corresponding terminals, unfixtured and in its designed operating attitude with all drain holes, and exposed to salt spray, the lighting apparatus 110 will show no evidence of external or internal corrosion or rust visible without magnification, nor include any corrosion which would result in the failure of the lighting apparatus 110*b*.

When filaments (e.g., LEDs 118) are (i) lighted at a design voltage that are intended to be used simultaneously in the headlamp and which in combination draw the highest total wattage, which can include but are not limited to filaments used for turn signal lamps, fog lamps, parking lamps, and headlamp lower beams lighted with upper beams when the wiring harness is so connected on the vehicle, (ii) operated at 90 flashes a minute with a 75%±2% current "on time"; (iii) if the lamp produces both the upper and lower beam, it is tested in both the upper beam mode and the lower beam mode under the conditions above described; (iv) subjected to 10 complete consecutive cycles having the thermal cycle profile shown in FIG. 6 of the Federal Motor Vehicle Safety Standard 108 ("FMVSS 108") (2004), and (v) energized commencing at point "A" of FIG. 6 and de-energized at point "B"; the lighting apparatus 110 will (a) show no evidence of delamination, fractures, entry of moisture, or deterioration of bonding material, color bleeding, warp or deformation visible without magnification; (b) show no lens warpage greater than 3 mm when measured parallel to the optical axis at the point of intersection of the axis of each light source with the exterior surface of the lens; and (c) meet the requirements of the applicable photometry tests of Table XIX and Table XVIII of the Federal Motor Vehicle Safety Standard 108 ("FMVSS 108") (2004).

The lighting apparatus 110 can be configured to resist road dirt, excessive humidity, and/or vibrations caused by operation of the lighting apparatus 110 on the road.

It is to be appreciated that even when subject to abrasive, corrosive, humid, and operative conditions described above, the lighting apparatus 110 is watertight, and more preferably, nearly completely sealed (airtight). For example, there will be no water is on the interior or air escapes, the lamp is not a sealed lamp.

Likewise, even impactful forces, such as: inward forces of 222 N directed normal to the headlamp aiming plane and symmetrically about the center of the headlamp lens face, a torque of 2.25 Nm applied to the headlamp assembly through the deflectometer, not only will the lighting apparatus 110 continue to not leak, but the aim of light emitted from the lighting apparatus 110 will not deviate more than 0.30° when the those forces/torques are removed. In some embodiments, the lighting apparatus 110 will provide a minimum vertical adjustment range not less than the full range of pitch of the vehicle on which it is installed.

Headlamp connectors are robust enough such that voltage drops caused by operating conditions will not exceed 40 my DC in any applicable filament circuit of the sample headlamp. Moreover, the wattage of each filament circuit of the sample headlamp will not exceed the desirable value for that type of headlamp.

As mentioned above, in some embodiments, the capsule, lead wires and/or terminals, and seal on each sample Type HB1, Type HB3, Type HB4, and Type HB5 light source, and on any other replaceable light source which uses a seal, can be installed in a pressure chamber (e.g., the headlamp fixture provided with the intended vehicle) so as to provide an airtight seal. The lighting apparatus 110 with an airtight seal on the low pressure (connector side) shows no evidence of air bubbles on that side after being subject to the conditions described above.

In some other embodiments, the measurement of maximum power and luminous flux are characterized by: (i) a luminous flux of between one thousand and two thousand lumens (1000-2000 lm) and (ii) a total quantity of visible light emitted can reach as high as five thousand lumens (5000 lm). Luminous flux is usually measured with the black cap installed on Type HB1, Type HB2, Type HB4, and Type HB5, and on any other replaceable light source so designed. For example, the electrical conductor and light source base are shrouded with an opaque white cover, except for the portion normally located within the interior of the lamp housing.

The hardness (as measured by a durometer) of the elastomeric gasket 134 can be increased so as to cause a resulting increase the pressure resistance capability of the bulb. This can result in the vehicle lighting apparatus 110 to be able to withstand the pressures shown in FIG. 13. For example, the elastomeric gasket 134 can be made of silicon or a hard plastic.

Finally, it is to be appreciated that the present invention can be integrated with cameras and sensors to pick out other cars on the road. This can be beneficial to allow for tracing a perfect, darkened opening for the other cars, while still throwing out high beam-like. In a way, the high-beam headlights never fully turn off. They instead dim their beam in the select spots necessary so as not to blind other drivers. The lighting apparatus 110 can also be configured to dim its beam when directed at road signs as you approach them so as not to dazzle the driver with a bright reflection.

From the foregoing, it can be seen that the present invention accomplishes at least all of the stated objectives.

LIST OF REFERENCE CHARACTERS

The following table of reference characters and descriptors are not exhaustive, nor limiting, and include reasonable equivalents. If possible, elements identified by a reference character below and/or those elements which are near ubiquitous within the art can replace or supplement any element identified by another reference character.

TABLE 1

List of Reference Characters

| | |
|---|---|
| 110 | replacement vehicle lighting apparatus |
| 112 | tower portion |
| 114 | mounting structure |
| 116 | opening for light emission |
| 118 | light emitting diodes (LEDs) |
| 120 | wire harness |
| 120NS | nylon sleeve |
| 122 | plug |
| 124 | flexible metal heat sinks |
| 126 | loops |
| 128 | wires |
| 130 | circuit board |
| 132 | heat conducting member |
| 132R | rivet |
| 132H | hole in heat conducting member for rivet |
| 134 | elastomeric gasket |
| 136 | collar |
| 138H | hole in collar |
| 138SS | adjustable set screw |
| 140 | base |
| 142 | moisture release for base |
| 144 | pegged holder for flexible metal heat sinks |

TABLE 1-continued

| List of Reference Characters | |
|---|---|
| 146 | mounting aperture in flexible heat sinks for a peg of pegged holder |
| 148 | receiver |
| 150 | etching/engraving/embossing |
| 152 | clocking and locking portion |
| 154 | angled protrusions |
| 160 | testing setup |
| 162 | photograph of test results for use of traditional LEDs |
| 164 | photograph of test results for use of CSP LEDs |
| 166 | example relative spectral power distribution |
| 168 | example CIE xy chromaticity diagram using the CIE xyY color space |
| 170 | pressure graph |

Glossary

Unless defined otherwise, all technical and scientific terms used above have the same meaning as commonly understood by one of ordinary skill in the art to which embodiments of the present invention pertain.

The terms "a," "an," and "the" include both singular and plural referents.

The term "or" is synonymous with "and/or" and means any one member or combination of members of a particular list.

The terms "invention" or "present invention" are not intended to refer to any single embodiment of the particular invention but encompass all possible embodiments as described in the specification and the claims.

The term "about" as used herein refer to slight variations in numerical quantities with respect to any quantifiable variable. Inadvertent error can occur, for example, through use of typical measuring techniques or equipment or from differences in the manufacture, source, or purity of components.

The term "substantially" refers to a great or significant extent. "Substantially" can thus refer to a plurality, majority, and/or a supermajority of said quantifiable variable, given proper context.

The term "generally" encompasses both "about" and "substantially."

The term "configured" describes structure capable of performing a task or adopting a particular configuration. The term "configured" can be used interchangeably with other similar phrases, such as constructed, arranged, adapted, manufactured, and the like.

Terms characterizing sequential order, a position, and/or an orientation are not limiting and are only referenced according to the views presented.

The Department of Transportation (DOT), in its Federal Motor Vehicle Safety Standards, 49 C.F.R. § 571.108 (2004), or "FMVSS 108," regulates all lamps, reflective devices, and associated equipment. FMVSS 108 can be found at www.nhtsadot.gov, is submitted herewith in an Information Disclosure Statement, and is hereby incorporated by reference in its entirety.

"Filament" means that part of the light source or light emitting element(s), such as a resistive element, the excited portion of a specific mixture of gases under pressure, or any part of other energy conversion sources, that generates radiant energy which can be seen. In an LED bulb, light is produced by passing the electric current through a semiconducting material—the diode—which then emits photons (light) through the principle of electroluminescence; the diode is just one example of a device that can therefore be considered a filament. Filaments can also be any light emitting element(s) which give the appearance of traditional carbon-based or tungsten-based filaments, such as those employed in Edison style light bulbs.

"Chromaticity" is an objective specification of the quality of a color regardless of its luminance. Chromaticity consists of two independent parameters, often specified as hue (h) and colorfulness (s), where the latter is alternatively called saturation, chroma, intensity, or excitation purity.

The "scope" of the present invention is defined by the appended claims, along with the full scope of equivalents to which such claims are entitled. The scope of the invention is further qualified as including any possible modification to any of the aspects and/or embodiments disclosed herein which would result in other embodiments, combinations, subcombinations, or the like that would be obvious to those skilled in the art.

What is claimed is:

1. A lighting apparatus for a vehicle comprising:
a housing comprising a mounting structure;
a lighting package comprising:
at least one circuit board;
an operative connection that allows for connection to an electrical system of the vehicle;
a filament, wherein said filament comprises at least one light emitting diode (LED) and said light emitting diode is soldered onto the at least one circuit board;
a flexible metal heat sink to dissipate heat caused by the at least one light emitting diode;
a collar having at least one threaded hole, said collar being configured so as to lock in an orientation clocked to 90° normal to the ground, thereby causing a surface of a light emitting source in the lighting apparatus to be oriented perpendicular to the ground;
an elastomeric gasket inserted between the collar and the housing;
a set screw that self-centers when tightened to the at least one threaded hole; and
a silicon sealant forming a watertight seal that prevents moisture from seeping into the collar, said silicon sealant being positioned on an under side of the lighting apparatus near the flexible metal heat sink.

2. The lighting apparatus of claim 1 wherein the lighting apparatus is configured to emit no more than a light output of seventy five-thousand candela.

3. The lighting apparatus of claim 2 wherein the light output comprises X Y chromaticity coordinates that comply with the Photometry Requirements listed in Table XIX-a or Table XIX-b of the Federal Motor Vehicle Safety Standard 108 ("FMVSS 108") (2004).

4. The lighting apparatus of claim 1 wherein during operation of the lighting apparatus, the lighting apparatus can withstand increases in pressure of at least 10 pounds per square inch (PSI) within a chamber of a headlamp of the vehicle when the lighting apparatus is installed therewithin, without causing the watertight seal to break or moisture to leak therethrough.

5. The lighting apparatus of claim 1 further comprising at least one other set screw, wherein:
the at least one other set screw opposes the set screw; or
the set screw and at least one other set screw are symmetrically arrayed about a circumferential surface of the collar.

6. The lighting apparatus of claim 1 further comprising a tolerance between the collar and other components of the lighting apparatus can be minimized by tightening the set screw to a point where the watertight seal becomes a hermetic seal.

7. The lighting apparatus of claim 1 further comprising a tough seal applied to an interior of the lighting apparatus to allow the lighting apparatus to facilitate maintaining the pressure within the housing.

8. The lighting apparatus of claim 1 wherein the flexible metal heat sink comprises a flexible metal fabric.

9. The lighting apparatus of claim 1 wherein the flexible metal heat sink conducts heat within a loop.

10. The lighting apparatus of claim 1 wherein the flexible metal heat sink comprises tinned copper strands.

11. The lighting apparatus of claim 1 wherein the flexible metal heat sink comprises aluminum fins.

12. The lighting apparatus of claim 1 further comprising a laser etched marking on the lighting apparatus that identifies a source of origin; or compliance with a government mandated regulatory standard.

13. The lighting apparatus of claim 1 wherein:

the housing comprises a tower portion;

the at least one circuit board comprises two circuit boards; and said two circuit boards being mounted on opposite sides of the tower member.

14. The lighting apparatus of claim 1 wherein the operative connection is established with a wire harness comprising one or more wires protected by a nylon sleeve.

15. The lighting apparatus of claim 1 wherein the filament creates the appearance of an Edison style light bulb.

16. The lighting apparatus of claim 1 wherein:

the lighting package is a chip scale package ("CSP") comprising an integrated circuit including the at least one circuit board;

a silicon die of the at least one LED:

is mounted on an interposer upon which pads or balls are formed; or is formed on pads that are etched or printed directly onto a silicon wafer, thereby resulting in a size of the chip scale package very close to the size of the silicon die.

* * * * *